Feb. 12, 1957          W. J. BABCOCK          2,780,942
SPEED CHANGE ATTACHMENT FOR POWER TOOLS
Filed July 7, 1952

INVENTOR.
WILLIAM J. BABCOCK
BY
Naylar and Lascagne
ATTORNEYS

United States Patent Office 2,780,942
Patented Feb. 12, 1957

2,780,942

SPEED CHANGE ATTACHMENT FOR POWER TOOLS

William J. Babcock, Lafayette, Calif.

Application July 7, 1952, Serial No. 297,507

1 Claim. (Cl. 74—417)

The present invention relates to improvements in speed changing attachment for power tools and more particularly to improvements in means for attaching such speed changing attachments to different types of power tools, while at the same time permitting the conventional chuck supplied with such a power tool to be employed in connection with the speed changing attachment.

Certain types of power tools, such as, for example, power drills, are provided with a male threaded motor spindle adapted to engage a female threaded chuck mounting forming a part of a conventional chuck. Certain other types of power drills are provided with a female threaded motor spindle, and in such drills a male threaded chuck mounting forming a part of a conventional chuck is employed to engage the motor spindle. Heretofore it has been necessary in designing speed changing attachments for such power tools either to supply means separate from the chuck of the power tool for mounting tools such as sanding disks and the like, on the output end of the speed changing attachment, or to provide a speed changing attachment which is capable of use with only one type of power drill, but not with both.

According to the present invention, a simple adapter element which may be selectively interposed between the spindle of the power tool and the speed changing attachment, or else between the output of the speed changing attachment and the chuck of the power drill, depending upon which type of power drill is to be used, makes possible the application of the same speed changing attachment to either of the two principal types of power drills referred to above, while at the same time making it possible to employ the chuck of the power drill on the output end of the speed changing attachment as a holding means for any type of tool which it is desired to use.

Figure 1:
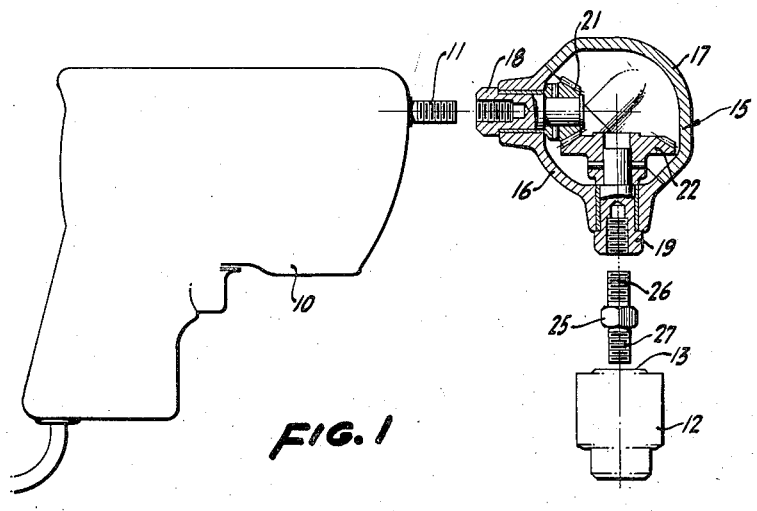
Figure 2:
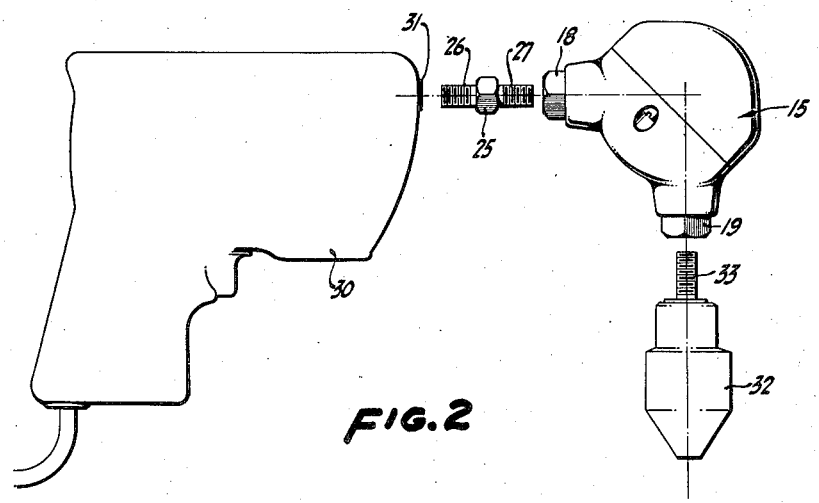

The novel features characteristic of the present invention are defined with particularity in the appended claims. The invention itself, however, together with additional objects and advantages thereof, will be best understood from the following description of a specific embodiment thereof when read in connection with the accompanying drawing, in which:

Figure 1 is a view in side elevation and partly in section of a speed changing attachment embodying the present invention, showing the same in position for attachment to an electric drill and chuck in which the drill is provided with a male threaded motor spindle and the chuck with a female threaded mounting; and Figure 2 is a view in side elevation of the same embodiment of the present invention illustrating the same in position for attachment to a power drill in which the motor is provided with a female threaded spindle and the chuck is provided with a male threaded mounting.

As shown in Figure 1, the speed changing attachment of the present invention is adapted for interposition between the motor spindle and the chuck mounting of a power tool such as an electric drill. Indicated at 10 is a conventional form of power drill having a motor spindle 11 which is provided with male threads and a conventional form of chuck 12 provided with a mounting 13 having female threads which, as the tool is usually sold, engage the male threads of the motor spindle 11.

In the embodiment of the invention illustrated, the speed changing attachment is, for example, a right angle drive attachment 15 comprising a two-part housing formed by casing elements 16 and 17. Casing element 16 is provided with a pair of bearings in which are mounted a female threaded input spindle 18 and a female threaded output spindle 19 connected by speed changing gearing, including gears 21 and 22, which are of different pitch diameters and which, in the embodiment shown, constitute a driving connection between the input and output spindles, causing the output spindle to rotate at half the speed of the input spindle.

The input spindle 18 is threaded to fit the male threads of the motor spindle 11 and thus may be directly attached thereto when the chuck 12 has been removed. In order to permit the chuck 12 to be used as a holder for a tool to be driven through the speed changing attachment, an adapter having male threaded elements at its opposite ends is provided. As shown in Figure 1, this adapter 25 is provided with male threads on its end 26 which are adapted to fit in the female threads of the output element 19 of the speed changing attachment 15 and is also provided with male threads on its end 27 which are adapted to fit the female threaded chuck mounting 13, the intermediate enlarged portion of the adapter preferably being non-circular in cross-section so as to permit it to be tightened by a wrench in a convenient manner into both the threads of the output element 19 and the chuck mounting 13.

As shown in Figure 2, the same embodiment of the invention may also be used with the type of electric drill indicated at 30 having a motor spindle 31 which is provided with female threads, and a chuck 32 having a mounting 33 which is provided with male threads. Such drills are, of course, normally supplied with the male threaded chuck mounting 33 threaded into the female threads 31 of the motor spindle. When it is desired to use the speed changing attachment of the present invention with such a drill, the adapter 25, instead of being interposed between the output element of the speed changing attachment and the chuck, is interposed between the motor spindle and the input element of the speed changer, the male threads on the end 26 of the adapter 25 engaging the female threads 31 of the motor spindle and the male threads of the end 27 of the adapter engaging the female threads of the input element 18 of the speed changer. The male threaded chuck mounting 33 is in this situation screwed directly into the female threads of the output element 19 of the speed changer.

It will thus be seen that by providing an adapter having male threaded elements at its opposite ends whereby it may be employed selectively to interconnect the input spindle and a female threaded motor spindle, or to interconnect the output spindle and a female threaded chuck mounting, the speed changing attachment of the present invention may be used with either of the two principal types of power operated drills. It will be appreciated, furthermore, that other types of speed changing devices than the right angle drive illustrated by way of example herein may be similarly adapted to use with either type of power drill described herein.

What is claimed as new is:

A speed changing attachment for use with a power tool having a motor spindle provided with a male thread and a chuck provided with a female threaded recess into which said male threaded spindle is threadable or alternatively for use with a motor spindle having a female threaded recess and a chuck provided with a male threaded mounting threadable into said recess, comprising a housing, input and output spindles rotatably mounted in said housing each being provided with a female threaded recess corresponding to the female threaded recess of said chuck or the female threaded recess of the motor spindle, speed changing gearing enclosed in said housing and constituting a driving connection between the input and output spindles, the housing being reversible to change the ratio of the gearing, whereby either female threaded spindle of the speed changing attachment may be associated with said male threaded motor spindle or male threaded mounting of the chuck to either reduce speed or to increase speed, and an adapter for mounting in either input or output spindle having male threaded elements at its opposite ends, the threading of each of said elements corresponding to the threading of the aforesaid male threaded motor spindle and male threaded mount for the chuck; whereby said adapter may be employed selectively to interconnect the female threaded form of chuck to either spindle of the speed changing attachment or to connect the female threaded motor spindle to either spindle of the speed changing attachment.

References Cited in the file of this patent

UNITED STATES PATENTS

| | | |
|---|---|---|
| 2,517,910 | Miller | Aug. 8, 1950 |
| 2,566,183 | Forss | Aug. 28, 1951 |
| 2,604,795 | Ristow | July 29, 1952 |